United States Patent

[11] 3,599,476

| [72] | Inventor | Robert B. Corbett<br>Mars, Pa. |
|---|---|---|
| [21] | Appl. No. | 873,765 |
| [22] | Filed | Oct. 31, 1969 |
| [45] | Patented | Aug. 17, 1971 |
| [73] | Assignee | Corbett Associates, Inc.<br>Mars, Pa.<br>Continuation-in-part of application Ser. No. 465,675, June 21, 1965, now abandoned. |

[54] THERMAL TESTING APPARATUS
21 Claims, 4 Drawing Figs.

| [52] | U.S. Cl. | 73/15.6 |
|---|---|---|
| [51] | Int. Cl. | G01n 3/18 |
| [50] | Field of Search | 73/15.4, 15.6; 33/147; 74/18.2, 18.0 |

[56] References Cited
UNITED STATES PATENTS

| 2,647,403 | 8/1953 | Fenske | 73/228 |
|---|---|---|---|
| 2,660,881 | 12/1953 | Van Degrift | 73/15.6 |
| 2,754,675 | 7/1956 | More | 73/15.6 |
| 3,010,307 | 11/1961 | Schwegler | 73/15.6 |
| 2,842,971 | 7/1958 | Cornell | 74/18.2 |
| 2,942,624 | 6/1960 | Good | 92/104 |

OTHER REFERENCES

Taylor: " Apparatus for Tensile Testing to 5,400° F. in Vacuum," in The Review of Scientific Instruments, Vol. 34, #5, May 1963, pgs. 500−504.

*Primary Examiner*—Richard C. Queisser
*Assistant Examiner*—Herbert Goldstein
*Attorney*—Hymen Diamond ABSTRACT: Apparatus for determining accurately the creep properties of material, such as hot tensile creep or creep rupture or stress relaxation. Precision is achieved by heating the specimen 16 uniformly, suppressing chimney effect, which would produce localized cooling of the specimen, and precisely aligning the specimen. Uniform heating is achieved by heating the specimen 16 indirectly through couplings 29 and 52 which are directly heated by heating elements 27 and 50 positionable to compensate for deformation of the specimen during stressing. Chimney effect is suppressed by heating and stressing in a chamber sealed at the ends (rolling loosely hanging seals 160 of high temperature-resisting, pliable collapsible membranes). These seals are prevented from collapsing by the pressure within the specimen chamber 10. Alignment is effected by suspending the specimen 16 from couplings 38 including bearings so that the specimen is suspended from the bearings and not from threads 84.

PATENTED AUG 17 1971
3,599,476
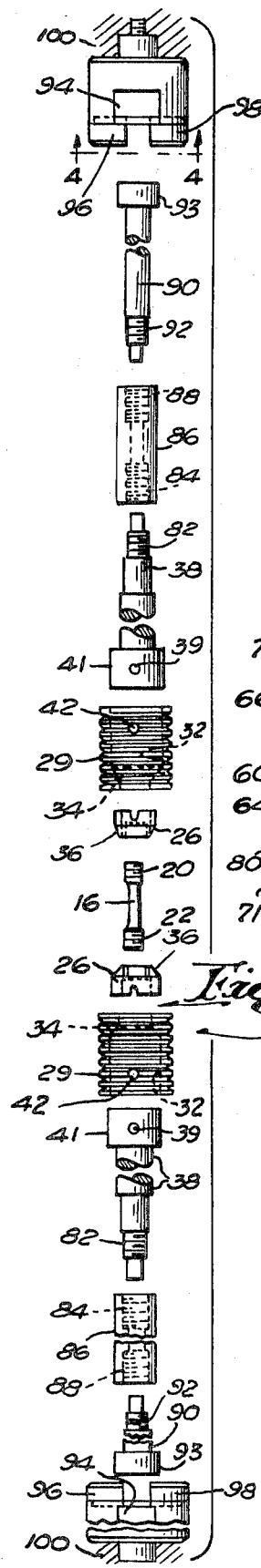
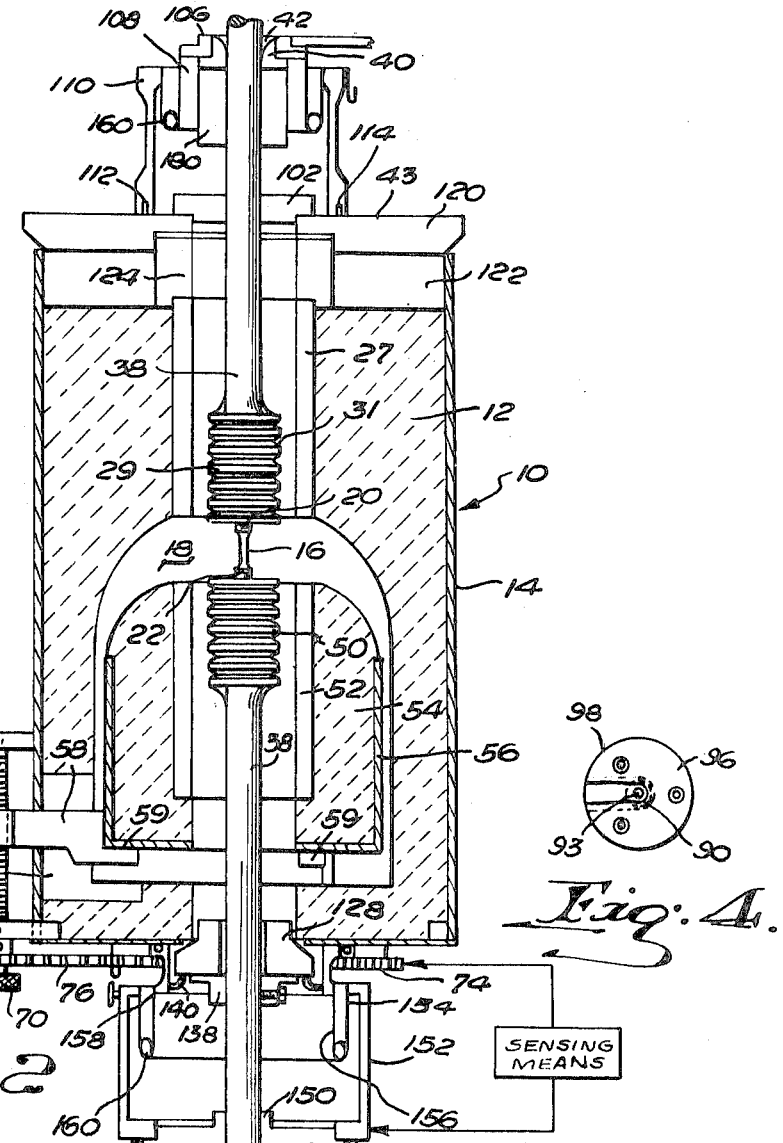
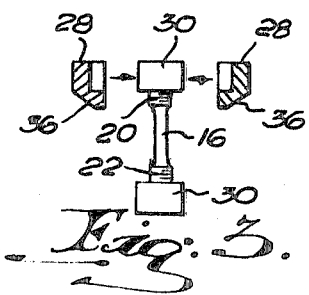
Fig. 1.   Fig. 3.
INVENTOR.
ROBERT B. CORBETT.
BY John A. Young
HIS ATTORNEY.

3,599,476

THERMAL TESTING APPARATUS

CROSS-REFERENCE TO RELATED APPLICATION

This application is a continuation-in-part of application Ser. No. 465,675, now abandoned, filed June 21, 1965 to Robert B. Corbett.

BACKGROUND OF THE INVENTION

This invention relates to an apparatus for testing materials, and more particularly, to an apparatus for testing materials which are heated and then subjected to external loading to establish the effects of heating and loading on the test specimen material.

In the testing of products, it is essential to use as precise testing conditions as practicable to make comparisons of materials and to preclude the introduction of any error-producing extraneous factors such as temperature variation or specimen misalignment which could interfere with the reliability of the testing and conclusions of testing.

In a testing apparatus, to evaluate the properties of the specimen, it is desirable to control the heat within a very narrow range to provide valid testing.

In testing materials for such properties as hot tensile, creep, creep rupture or stress relaxation, it is essential to produce temperature uniformity over the gage length of the specimen. These testing conditions are prescribed by standards, and the ASTM Standard 139-58T for creep and time for rupture tests must be carried out at given temperatures and within a very narrow range of variation. For example, for tests conducted up to and including 1,800° F., the temperatures for testing must be accurately maintained within ±3° F. along the length of the specimen. At above 1,800° F., the variation should be ±5° F. The trend, is not in the direction of relaxing these standards, but, on the contrary, in the direction of even further tightening the standards to reduce permissible variations even further and provide more accurate testing results.

The existing heating apparatus for testing specimens, have encountered considerable difficulty in meeting these standards established for uniformity in temperature and in meeting the specified range in temperature. The problem is particularly difficult in seeing that the temperature is uniform along the gage length of the specimen.

SUMMARY OF THE INVENTION

Accordingly, it is one of the objects of the present invention to provide a test apparatus which will accurately control the temperature and temperature distribution over the gage of the test specimen.

A further object of the present invention is to provide an improved heating apparatus which will not only generate a precisely controlled temperature, but will also communicate a heating effect substantially uniformly throughout the gage length of the test specimen. In accordance with this object of the invention, novel means are provided which compensate for elongation of the test specimen under stress so that regardless of change in shape and size of the gage of the test specimen, the heating effect will remain substantially unaffected.

A still further object of the present invention is to provide by means of unique seals an improved heating effect for test specimens, which obviates the chimney effect normally associated with prior art devices, wherein heating is of greater intensity at a higher part of the apparatus as compared with a lower portion. Because of this, there is produced a nonuniform heating effect along the length of the test specimen. In accordance with the present invention, such error-producing effects are eliminated and this is accomplished without introducing either a vertical or transverse load on the specimen train as is the case with prior devices.

In accordance with the teachings of the prior art vacuum testing apparatus is provided in which the sealing components are bellows connected to the stress-producing train. This invention arises from the discovery that bellows introduce longitudinal (vertical) and transverse (horizontal) restraints into the stress-producing train, or the straining and deforming means, and do not permit free movement of the extension rods of the train while the specimen is being stressed. The bellows has been found to introduce bending along the specimen length which leads to erratic and frequently unusable data. In accordance with this invention the seals are substantially loosely or freely hanging or loosely or freely suspended, readily collapsible, or pliable membranes of a material capable of resisting relatively high temperatures. Typically the membranes may be composed of silicone rubber capable of resisting temperatures up to 650° F. It has been found that to further protect the membrane from high-temperature deterioration a heat shielding should be provided between the membrane and the stress-producing train. The membranes are capable of deforming readily in directions, either vertical or horizontal, in which force is applied to them. In arriving at this invention it has been realized that when used to seal a specimen chamber which is at or near atmospheric pressure, such seals will be prevented from collapsing by the pressure within the specimen chamber.

An important feature of the present invention is that axial alignment can be readily and precisely obtained within the train of elements exerting the pulling effort on the test specimen and in this way more precise testing results are obtained in determining the strength of the specimen. In the absence of precise axial alignment, erroneous readings are obtained. To obtain optimum results, 15 percent alignment or better must be obtained and this is beyond the capacity of most of the presently used testing apparatus. In contrast with this, the present invention can easily obtain orders of alignment of 15 percent or less. The permissible range of misalignment depends upon the character of the material being tested. For ductile materials, 15 percent misalignment is tolerable; but for brittle materials, misalignments of even in the order of 5 percent is objectionable. The present invention, since it precisely aligns the train of components, can secure the referenced fine degrees of alignment which are much beyond the range of alignment capabilities of existing test apparatus.

It is an important feature of the present invention that the test specimen is heated by indirect means as distinguished from direct means, and in this way, such error-producing factors as change of specimen size, shape and length will not introduce error, nor does the aforementioned chimney effect produce error. In contradistinction to the shunt furnaces which utilize a plurality of windings along the length of the heating chamber or specimen, the present invention utilizes indirect heating means which provide a precision of heating effect throughout the length of the test specimen and by means which are substantially less complex and expensive than the multiple-zoned furnace which the present invention replaces.

The present invention completely omits heated walls which are opposite the gage length in order to eliminate errors in thermocouple readings. In addition, as the specimen elongates, the heating chamber may be changed in size in order to maintain a consistent heating effect regardless of such change in shape.

Also in accordance with the present invention, the enclosure for the specimen is completely sealed so that, if it is desired, the use of a controlled atmosphere can be provided and also because of such sealed condition, the chimney effect is precluded. To the extent that the chamber is sealed by readily collapsible membranes, as described above, the controlled atmosphere within the chamber must be substantially at atmospheric pressure at least during use of the apparatus. It is to be noted that when the chamber is in use and the specimen is heated the pressure within the chamber increases so that initial pressure particularly of other gases than air may be lower than atmospheric pressure.

One object of the present invention is to eliminate such previously used inefficient heating apparatus which are both complicated and inexact because of the chimney effect and also because of the failure to take into account the change in size of the specimen, and to provide in its place, a more economical, more readily operable test apparatus which will precisely establish a temperature and will provide a uniform heating effect along the gage length of the specimen taking into account the change in size of the specimen as it occurs. Also in accordance with this object of the invention, the heating apparatus is intended to be readily adjustable to take into account different size of specimens and different schedules of testing as the operator prefers.

A second object of the present invention is to assure that the tensile load on the specimen is applied as nearly axially as practicable so as to avoid any effect of nonaxiality.

BRIEF DESCRIPTION OF THE DRAWING

The foregoing and additional objects of the present invention will become apparent from a consideration of the following description, which proceeds with reference to the accompanying drawings, wherein:

FIG. 1 is a view, partly in longitudinal section, of apparatus according to this invention including the heating furnace and its components;

FIG. 2 is an exploded view of the test apparatus, but not including the heating elements and heating furnace;

FIG. 3 is a detail view illustrating one type of coupling between the test specimen and its connecting structure; and, FIG. 4 is a view taken on line 4–4 of FIG. 2.

DESCRIPTION OF PREFERRED EMBODIMENT

Referring now to the drawings, and particularly to FIG. 1, the furnace, designated generally by reference numeral 10, includes a container or chamber 18 and has refractory insulated walls 12 and a surrounding jacket 14. The test specimen, designated generally by reference numeral 16 and having a precisely dimensioned size and gage length, is disposed within chamber 18 and its opposite ends 20, 22, which may be threaded are secured by screwing into insert grips 26, there being one insert grip 26 for each end.

In the case of button head type of specimens, the inserts must be of the split type shown in FIG. 3 and designated in this case by reference numeral 28. The exterior dimensions of the inserts 26 and 28 are the same as that both threaded end and button end specimens of all sizes can be accommodated with one pair and size of a hot grip coupling 29.

A stationary heating element 27 surrounds an upper hot grip coupling 29 which has a serrated surface 31. The pitch of the serrations is approximately 55°, which is found to be the optimum angle for receiving radiant heat from the heating element 27. The interior of the hot grip coupling 29 has a tapered seat 34 to receive the two coupling inserts 26, 28, having tapered surfaces 36, which come into seating engagement with the tapered seat 34, when the inserts are assembled over the enlarged end 30 of the test sample and are then passed through opening 32 of the coupling 29. The coupling 29 is secured to an extension rod 38 with an end 41 which is proportioned to fit within opening 32 of the hot grip coupling 29 and has an opening 39 which is registerable with opening 42. A pin (not shown) is then passed through aligned openings 39, 42 to couple the parts together. The rod 38 passes through the heating apparatus and is sealed after it passes through the upper end wall 43 by a collar 40 and packing 42. The chamber 18 typically contains air at substantially atmospheric pressure and is fully sealed so that there is no circulation of atmosphere and there is avoided any chimney effect caused by rising currents of heated air. In previous devices which were unsealed, the outside air was drawn into the system and the gage length of the test specimen was swept by air which nonuniformly heated the test specimen introducing substantial erroneous readings.

Free movement of the rod 38 is permitted without either vertical or transverse restraint and yet the chamber is completely sealed, this being provided by a diaphragm which will be described later.

The lower portion of the tensile-producing train is substantially the same as the upper portion except in details which will be described.

The lower hot grip coupling 50 is heated by a heating element 52 which surrounds coupling 50 and is supported by a refractory body 54 having a shell 56. The heating element and its support structure is suspended on a number of vertically movable legs 58, approximately three in number which are spaced 120° apart, and which project inwardly to provide supporting surfaces 59. Each leg includes a nut 60 which extends through a slot 64 in refractory body 12 and shell 14 and is connected to a vertical screw 66 having a knob 70 which permits the support legs 58 to be adjusted upwardly and downwardly in accordance with the size of the specimen 16 so that the line of sight radiation from heating element 52 encompasses only the serrated surfaces of the lower hot grip coupling 50. The screw 66 is also turnable by a sprocket 71 which is driven along with the other two sprockets through chain 76. The chain 76 interconnects each of the three spaced screws 66 so that the legs 58 are simultaneously raised and lowered to raise and lower the heating elements 52 and to maintain a planar supporting relationship through the support surfaces 59.

Each screw is journaled in spaced plates 78, 80 which project radially from the shell 14 and permit the screw to turn freely by the knob 70 by means of the sprocket wheels 71 acting through the chain 76.

The purpose of having the lower heating element adjustable is so that the heating element will be in line of sight only with the hot grip coupling 50 and as the test specimen 16 elongates under heat and tensile force communicated thereto through the upper and lower rods 38, the heating element 52 is caused to lower. None of the heating effect goes directly from the heating elements to the test specimen; instead, the heating elements radiantly heat the hot grip couplings which have serrations in the order of approximately 55° and these in turn communicate heat by conduction to the specimen. The purpose of having the serrations is to provide a greater heating surface which will collect more heat than a plane surface.

Precise alignment of the train of components exerting a tensile force on the specimen is obtained in the manner next to be described. Each of the components forming the train is coaxially aligned with precision so that at the time a pulling force is exerted, it will exert such tensile force in alignment with the specimen in a manner not substantially beyond approximately ±5 percent deviation from the axis connecting the two points of tensile force exertion on the specimen. Consequently, the uniformity of pull across the cross section of the specimen is developed.

At both ends of the specimen train a plate 96 having a slot 94 admits the end 93 of pull rod 90. The adapter 98 in turn is secured to stationary part 100. Considering that in the modern testing procedures there is a preference to use smaller test sample specimens, and having a variance of brittleness to high ductility there is a considerable importance attached to the alignment and securement of such alignment within a very precise range. The present invention does, of course, by reason of the novel train secure such precision of alignment and well within the range of material sizes and compositions.

The upper and lower ends of the furnace are substantially similar. At the upper end the rod 38 is passed through a refractory split ring 102 and then through a collar 40 and packing 42 which are secured to a lift ring 106. The lift ring 106 is fastened to the end of a diaphragm rolling seal 108 which is in the form of a membrane secured respectively to rings 106 and cylinder 110.

The diaphragm 108 is composed of a readily collapsible thin material, typically silicone rubber on 1/64 inch thick or less, and is freely or loosely suspended in the form of a festoon between ring 106 and the upper rim of cylinder 110, being folded back on itself between the ring 106 and the cylinder 110. By "readily collapsible" is meant a diaphragm 108 which does not transmit lateral force to the specimen 16. The material of the diaphragm 108 should be capable of withstanding temperatures of the order of several hundred degrees Fahrenheit. However, it is desirable to protect the membrane 108 with a heat shield system 180. The lower end of the cylinder 110 is sealed by an O-ring seal 112 within a groove 114 in the end of the cylinder 110. The cylinder rests on an upper enclosure 120 which in turn is supported on two refractory layers 122 and 124. The upper end of the chamber is thus completely enclosed, while at the same time permitting the pull rod 38 to move upwardly with substantially no restraint, either vertical or horizontal. There is no opportunity for circulation of air or other atmosphere through the top of the chamber.

At the lower end of the chamber, the pull rod 38 passes through a split refractory plug 128 having an oversize opening and which is held by a collar 138 until clips 140 are positioned to hold it in place. The lower rod has a collar 150 secured thereto which draws the cylinder 152 downwardly therewith, and with it one end 154 of a diaphragm 156 which has a movable, flexible wall similar to 108 above secured at its end 158 to a fixed part of the structure. In this way, the lower rod 38 can move downwardly and it will flex the diaphragm but without enabling any leakage paths to develop. As the rod moves downwardly, it will carry with it the collar 138 which will move away from the plug 128. In this way, no leakage paths are permitted to develop during movement of the lower rod 38 or the upper rod 38 and moreover, due to the flexible nature of the upper and lower diaphragms 108 and 156, no transverse forces are exerted on either the upper or lower rods to affect in any manner alignment of the specimens.

The two rods are sealed in substantially similar manners and by means of refractory components which will not deteriorate under exposure to the heat which is encountered in these zones of the furnace of the test apparatus.

Portions of the membrane of the festooned diaphragm may be separated if necessary by glass beads, sand 160, or the like, to insure rolling contact and proper operation of the diaphragm.

At the lower end of the apparatus, where the lower pull rod 38 passes through refractory disc 40, the refractory disc can be secured by wing nuts or the like to the cylinder 152.

In use, the test specimen 16 is combined with the hot grip coupling inserts 26 or 28, and the hot grip inserts 26 or 28 are positioned within opening 32 of the hot grip coupling 29 and 50 with the tapered sides bearing against a complementary side 34 within the couplings. Each coupling is then secured by a pin (not shown) to rod 38 by passing through aligned openings 39, 42, in the couplings 29 and 50 and ends 41 of the pull rods 38. Each pull rod 38 is fastened to a coupling 86 of a second pull rod 90 by means of the threaded sections 84, 88 which serves merely to hold while the bearing surfaces on either side of the threads contribute to the alignment. The ends 92 of each pull rod 90 are then fitted within a quick change adapter 98 of member 100 and the train is then adapted to develop tensile force on the specimen 16. The tensile force is communicated to the specimen after the specimen has been heated to a preferred temperature by means of the heating elements 27, 52 which communicate their heating effect by radiant heat transfer to the serrated surfaces of the hot grip coupling means 29, 50. The hot grip coupling elements transfer the heat conductively to the specimen 16 from the opposite end. None of the heat is transferred directly to the specimen 16; in this way, there is avoidance of erroneous readings by the thermocouples. The lower heating elements are adjusted vertically by means of the screws 66 which can raise and lower the heating element by turning the screws and raising and lowering the arms 58 which provide support surfaces 59 and 61 for the lower heating element. Where the test specimen is longer, then the heating element is correspondingly lowered, and conversely, where the test specimen is short, the heating element is raised by turning the screws 66 in the direction which raises the support 59. Also, in order to obtain the same heating effect, as tensile force produces an elongation of the test specimen, the lower heating element is lowered, by rotating sprocket wheels 71 which are connected by chain 76 to each other associated with each of the three spaced screws 66 and arms 58 so that the heating element 52 is lowered and heat is communicated radiantly only through the hot grip coupling 50 which in turn transmits heat to the specimen 16 by heat conduction. In this way, the mechanism of transfer of heat remains the same in spite of the elongation of the specimen. The furnace described has only two heated zones and has completely omitted shunts or other zones, making it possible to uniformly heat any specimen regardless of its dimension and even while the specimen has elongated under tests. The uniformity of the temperature along the gage length is maintained at all times and, since there are no heated walls opposite the gage length, there is no direct radiation to effect the thermocouple readings.

The adverse influence of the chimney effect is avoided by completely entrapping atmosphere within the chamber 18. There is no circulation of air or other atmosphere within the chamber 18 because each of the opposite ends of the enclosure are completely closed. As either the upper or lower pull rod 38 is displaced, there is moved with it the collar 40 and seal 42 and the connected portion of the diaphragm 108 through the lift ring 106 and while the diaphragm conflects, it does not open any leakage paths. Conversely, when the lower pull rod 38 moves downwardly, pulling with it the cylinder 152, the diaphragm 156 can be operated. Since the enclosure of the specimen is completely sealed, while at the same time permitting movement of the pull rods, the chimney effect or circulation-of-air effect which is prone to produce a temperature differential along the length of the gage is effectively prevented. The chamber can, if desired, be filled with an inert atmosphere or it can be filled with air, whichever is desired.

Movement of the rod 38 can be operatively connected by suitable sensing means 200 if desired, and is adapted to actuate the sprocket wheels 74 so that the screws 66 are turned in the direction necessary to effect a lowering of the lower heating element 52 so that such lowering is coordinated with extension of the specimen 16 and radiant heating effort is continuously applied to the hot grip coupling and none of the radiant heating is communicated to the specimen as the specimen is elongated. In this way, the effects of the heating are more closely controlled and the mechanism of heating of the specimen is at all times by conduction of heat to its ends through the coupling, and in this way the heating effect is indirect and derived by this mechanism from the heating elements.

Typically the upper rod 38 and hot grip coupling 29 is maintained relatively fixed, moving vertically only a very short distance, while the lower rod 38 and coupling 50 moves over a greater distance and the heating element 52 is moved with it either manually or automatically. For the purpose of identifying the invention, the expression "heating means" is used to refer to the heating means as a whole including both the hot grip couplings 29 and 50 and the heating elements 27 and 52. The hot grip couplings are sometimes referred to as "heat-receiving means" and the heating elements are sometimes referred to as "heat-emitting means" or "heat-emitting elements" or "heating elements."

At the upper end of the furnace is a heat shield system 180 to protect the diaphragm by shielding the membrane from radiant heat.

Although the present invention has been illustrated and described in connection with a single example embodiment, it will be understood that this is illustrative of the invention and is by no means restrictive thereof. It is reasonably to be expected that those skilled in the art can make numerous revisions and adaptations of the invention, and it is intended that such revisions and adaptations will be included within the scope of the following claims as equivalents of the invention.

What I claim is:

1. Apparatus for heating and testing a specimen of material, the said specimen being a length of material of precisely dimensioned cross section, said apparatus comprising: means for clamping and retaining the ends of said specimen therebetween, means connected to said clamping and retaining means, for imposing an aligned force on said specimen for deforming said specimen along the line of said force, a heating means for imparting a heating effect upon the length of said specimen, and means, cooperating with the force imposing means, the heating means and the specimen, for positionally changing said heating means in accordance with the deformation of said specimen to provide for relatively constant exposure to heat of said specimen along its length.

2. The apparatus of claim 1 including means connected to the changing means for setting the initial position of the heating means in accordance with the length of the test specimen for uniform heating of the said specimen.

3. The apparatus of claim 1 wherein the force-imposing means includes force-transmitting coupler means for producing drawing effort at the opposite ends of the specimen, and articulated connection means forming a part of said coupler means to provide for alignment of said specimen and coupler means.

4. The apparatus of claim 1 wherein the force-imposing means imposes a tensile force on the specimen.

5. The apparatus of claim 1 wherein the heating means includes heat-receiving means connected to the specimen to transmit heat received by said heat-receiving means to said specimen and heat-emitting means for heating said heat-receiving means and also wherein the means for positionally changing the heating means includes means cooperative with the heat-emitting means, the heat-receiving means and the specimen to positionally change the heat-emitting means to correspond to the deformation of the specimen.

6. A test apparatus for testing specimens of a carefully controlled cross section comprising: articulated connection means one on each end of said specimen for effecting tensile force on the test specimen, to produce deformation of the specimen, a serrated heat-receiving means one at each end of said specimen for receiving heat and conducting such heat to the test specimen through the ends thereof, said heat-receiving means being moved with said connection means, a heat-emitting element for heating each heat-receiving means, and means, responsive to the deformation of the specimen, for producing relative displacement of said elements one relative to the other in synchronism with said heat-receiving means as the test specimen deforms whereby the heating effect remains substantially constant.

7. A test apparatus for testing specimens of a carefully controlled cross section, comprising: articulated connection means one on each end of said specimen for effecting tensile force on the test specimen, to produce deformation of the specimen, a serrated heat-receiving means one at each end of said specimen for receiving the heat and conducting such heat to the test specimen through the ends thereof, said heat-receiving means being moved with said connection means, a heat-emitting means for heating each of said heat-receiving means, means, responsive to the deformation of said specimen, for producing relative displacement of said heat-emitting means one relative to the other in synchronism with said heat-receiving means as the test specimen deforms whereby the heating effect remains substantially constant, and means for receiving the ends of said tension-producing means and adapted to communicate tensile force on a plurality of specimens of variable diameter.

8. An apparatus for heating and testing a sample of test material comprising: means for receiving the ends of said sample and adapted to effect a clamping connection therewith, means connected to said ends receiving means for stressing and deforming said sample, a radiant heat receiving structure disposed one on each end of said sample to receive heat and connected to said sample to transmit such heat by thermal conduction to said sample, a heat-emitting element for heating each of said heat-receiving structures, and means, responsive to the deformation of said sample, for producing relative displacement of said elements one with reference to the other as said sample is deformed and in accordance with the deformation.

9. A heating and testing apparatus for a test specimen including means for stressing said specimen and having heating elements thermally separate from said specimen, radiant-heat receiving means thermally conductively connected to said specimen and disposed in heat-receiving relationship with said heating elements and in conductive heat transmission relationship with said specimen, and adjusting means connected to said elements for varying the relative position of said elements in accordance with the length of said specimen along the length of said specimen.

10. The apparatus of claim 9 including means for relatively displacing the heating elements automatically during deformation of the specimen to maintain automatically a substantially constant heating effect upon said specimen.

11. Apparatus for heating and testing a specimen of material including a heating chamber for said specimen having therein heating elements, radiant heat receiving means in said chamber, separate from said specimen, thermally conductively connected to said specimen and disposed in heat-receiving relationship with said heating elements, adjusting means connected to said elements for varying the relative position of said heating elements in accordance with the length of test specimen, force transmitting means at least partly external to said chamber for imparting an axial force to effect an axial drawing effort on said specimen to deform said specimen, axially, and sealing means, in said chamber, connected to said transmitting means which provides for extension of said transmitting means and adapted to provide for deformation of said specimen relative to said chamber without loss of heat from within said chamber.

12. The apparatus of claim 11 wherein the sealing means includes a diaphragm adapted to be secured to the force transmitting means to provide movement thereof without introducing substantial axial or transverse forces.

13. Apparatus for heating and testing a specimen of material having a portion of predetermined shape and size including a heating furnace for said specimen, the said furnace including a heating chamber having at least two axially spaced heating elements elements, means connected to said elements for adjustably moving said elements, means mounting said specimen axially between said elements, an element being on each end of said specimen, heat-receiving means in heat-receiving relationship with said elements for receiving heat from said elements, means connecting said receiving means to said specimen to communicate heat to said specimen, and means connected to said specimen for imposing axial stress on said specimen to effect deformation thereof, said elements being movable by said moving means in proportion to the deformation of said specimen to maintain a substantially constant heating effect on said specimen.

14. Apparatus for heating and testing a specimen of material, the said specimen being a length of material of precisely dimensioned cross section, the said apparatus including means to be connected to said specimen, for clamping and retaining the ends of said specimen therebetween, heat-receiving means, separate from said specimen, but connected in thermal conduction relationship with said specimen, means, connected to said clamping and retaining means, for imposing an aligned force on said specimen for straining and deforming said specimen along the line of said force, and heat-emitting means spaced physically from said heat-receiving means but substantially only in direct heat-interchange relationship with said heat-receiving means, and not in direct heat interchange relationship with said specimen, for imparting a heating effect upon the length of said specimen substantially only indirectly by thermal conduction from said heat-receiving means to said specimen.

15. Apparatus for heating and testing a specimen of material, the said specimen being a length of material of precisely dimensioned cross section, the said apparatus including means to be connected to said specimen, for clamping and retaining the ends of said specimen therebetween, heat-receiving means, separate from said specimen, but connected in thermal conduction relationship with said specimen, means, connected to said clamping and retaining means, for imposing an aligned force on said specimen for straining and deforming said specimen along the line of said force, and heat-emitting means only in direct heat interchange relationship with said heat-receiving means, for imparting a heating effect upon the length of said specimen indirectly by thermal conduction from said heat-receiving means to said specimen, said heat-emitting means being positionally changeable and including means for cooperating with the force-imposing means and the heat-receiving means positionally changing the heating means in accordance with the distortion of said specimen.

16. Apparatus for heating and testing a specimen of material, the said specimen being a length of material of precisely dimensioned cross section, the said apparatus including a container having said specimen therein in an atmosphere substantially at atmospheric pressure, heating means for said specimen in heat interchange relationship with said specimen, means, connected to said specimen within said container, and extending outside of said container and being movable for imposing an aligned force on said specimen for straining and deforming said specimen along the line of said force, diaphragm seal means in the form of a substantially loosely hanging readily collapsible membrane means, interposed between said straining-and-deforming means and said container, for sealing said container and suppressing convective heat flow with respect to said specimen while permitting substantially free movement of said straining-and-deforming means without vertical and transverse restraint on said straining-and-deforming means, and means for thermally isolating said diaphragm-seal means from said straining-and-deforming means, said container and said heating means.

17. The apparatus of claim 16 wherein the diaphragm seal means includes annular inner and outer supports for the membrane and the membrane is suspended in a festoon between the inner and outer supports.

18. The apparatus of claim 17 wherein the straining-and-deforming means is sealed pressure tight to the inner support and the said inner support is movable with the straining-and-deforming means and said outer support is fixed.

19. The apparatus of claim 16 wherein the membrane is composed of a material capable of withstanding a relatively high temperature of the order of several hundred degrees Fahrenheit.

20. The apparatus of claim 16 including shielding means for protecting the membrane from the heat emitted by the heat parts within the container.

21. Thermal testing apparatus for testing a specimen of material to determine mechanical properties of the material including a train of components to be connected to said specimen for stressing said specimen, said train including heat-receiving means separate from said specimen, to be thermally conductively connected to said specimen, and heat-emitting means spaced physically from said heat-receiving means and in heating relationship with said heat-receiving means but substantially out of heating relationship with said specimen for heating said heat-receiving means substantially directly and said specimen substantially indirectly substantially only by thermal conduction through said heat-receiving means.